United States Patent
Kim et al.

(10) Patent No.: US 10,216,037 B2
(45) Date of Patent: Feb. 26, 2019

(54) PHOTO-LUMINESCENT DISPLAY DEVICE

(71) Applicant: Samsung Display Co., Ltd., Yongin-si (KR)

(72) Inventors: Kanguk Kim, Hwaseong-si (KR); Donchan Cho, Seongnam-si (KR); Taimei Kodaira, Hwaseong-si (KR); Sangji Park, Seoul (KR); Youngje Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/835,734

(22) Filed: Dec. 8, 2017

(65) Prior Publication Data

US 2018/0164640 A1 Jun. 14, 2018

(30) Foreign Application Priority Data

Dec. 9, 2016 (KR) .................. 10-2016-0167755

(51) Int. Cl.
*G02F 1/1335* (2006.01)

(52) U.S. Cl.
CPC .. *G02F 1/133606* (2013.01); *G02F 1/133504* (2013.01); *G02F 1/133608* (2013.01); *G02F 1/133617* (2013.01); *G02F 2001/133614* (2013.01)

(58) Field of Classification Search
CPC ............................. C02F 1/133606; C09K 11/06
USPC ........................................ 362/97.2, 97.3, 245
See application file for complete search history.

(56) References Cited

U.S. PATENT DOCUMENTS

| 8,294,848 B2 | 10/2012 | Cho et al. |
| 9,599,856 B2 | 3/2017 | Lee et al. |
| 9,627,363 B2 | 4/2017 | Kim et al. |
| 2015/0102992 A1* | 4/2015 | Klement ............... G06F 1/3228 345/102 |
| 2016/0195774 A1 | 7/2016 | Lee et al. |
| 2017/0242303 A1* | 8/2017 | Meyers ............ G02F 1/133617 |

FOREIGN PATENT DOCUMENTS

| KR | 10-2010-0111103 | 10/2010 |
| KR | 10-2016-0015480 | 2/2016 |
| KR | 10-2016-0084794 | 7/2016 |
| KR | 10-2016-0101571 | 8/2016 |

* cited by examiner

*Primary Examiner* — Allyson Trail
(74) *Attorney, Agent, or Firm* — H.C. Park & Associates, PLC

(57) ABSTRACT

A photo-luminescent display device includes: a backlight to output a backlight; a first substrate and a second substrate facing each other; a pixel electrode disposed on the first substrate; a light amount control layer disposed in a space between the first substrate and the second substrate to control a transmittance of the backlight; a first light conversion portion disposed on the second substrate to convert a wavelength of the backlight; a light diffusion portion disposed adjacent to the first light conversion portion to diffuse the backlight; and a barrier surrounding the first light conversion portion. The light diffusion portion and the barrier include a unitary structure.

21 Claims, 9 Drawing Sheets

PHOTO-LUMINESCENT DISPLAY DEVICE

CROSS-REFERENCE TO RELATED APPLICATION

This application claims priority from and the benefit of Korean Patent Application No. 10-2016-0167755, filed on Dec. 9, 2016, which is hereby incorporated by reference for all purposes as if fully set forth herein.

BACKGROUND

Field

Exemplary implementations of the invention relate generally to a photo-luminescent display devices and, more particularly, to photo-luminescent display devices that are easy to manufacture and has excellent display quality.

Discussion of the Background

Display devices may be classified into liquid crystal display ("LCD") devices, organic light emitting diode ("OLED") display devices, plasma display panel ("PDP") devices, electrophoretic display devices and the like based on the light emitting scheme thereof.

Recently, display devices in which a color filter is replaced with a fluorescent pattern have been studied. A display device including such a fluorescent pattern is referred to as a photo-luminescent display ("PLD") device.

The photo-luminescent display devices may display red, green and blue colors by using a blue light source, a red fluorescent element (e.g., a phosphor) which converts blue straight light into red scattered light, a green phosphor which converts blue straight light into green scattered light and a blue transmitting layer which transmits blue straight light.

However, the process of forming a light conversion portion that includes a phosphor on a substrate is complicated and relatively expensive.

The above information disclosed in this Background section is only for enhancement of understanding of the background of the inventive concepts, and, therefore, it may contain information that does not constitute prior art.

SUMMARY

Photo-luminescent display devices constructed according to exemplary implementations of the invention are s easy to manufacture and have improved display quality.

Additional aspects will be set forth in the detailed description which follows, and, in part, will be apparent from the disclosure, or may be learned by practice of the inventive concept.

According to an exemplary implementation of the invention, a photo-luminescent display device includes: a backlight to output a backlight; a first substrate and a second substrate facing each other; a pixel electrode disposed on the first substrate; a light amount control layer disposed in a space between the first substrate and the second substrate to control transmittance of the backlight; a first light conversion portion disposed on the second substrate to convert a wavelength of the backlight; a light diffusion portion adjacent to the first light conversion portion to diffuse the backlight; and a barrier surrounding the first light conversion portion. The light diffusion portion and the barrier comprise a unitary structure.

The photo-luminescent display device may further include a second light conversion portion disposed on the second substrate to convert the wavelength of the backlight light.

The first light conversion portion may be configured to convert the backlight into a light having a wavelength ranging from about 500 nm to about 565 nm. The second light conversion portion may be configured to convert the backlight into a light having a wavelength ranging from about 620 nm to about 780 nm.

The light amount control layer may include a liquid crystal layer.

One of the first light conversion portion and the second light conversion portion may include at least one of a quantum dot and a quantum rod.

The photo-luminescent display device may further include one of a red color filter or a green color filter disposed between the first light conversion portion and the second substrate.

The photo-luminescent display device may further include a yellow filter disposed between the second substrate and at least one of the first and second light conversion portions. A transmittance of the yellow filter in a wavelength range from about 450 nm to about 495 nm may be less than a transmittance of the yellow filter in a wavelength range of about 500 nm or more.

The photo-luminescent display device may further include a light transmission portion disposed between the light diffusion portion and the second substrate, the light transmission portion to transmit an incident light.

The photo-luminescent display device may further include a blue color filter disposed between the light diffusion portion and the second substrate.

The photo-luminescent display device may further include a black matrix located between the barrier and the second substrate, the barrier includes barrier grid that is defined by barrier walls, and the black matrix having a width larger than a width of one of the barrier walls.

The first light conversion portion, the second light conversion portion, and a light transmission portion may be successively arranged in a row.

The photo-luminescent display device may further include a yellow filter disposed between the first light conversion portion and the second substrate and between the second light conversion portion and the second substrate. A transmittance of the yellow filter in a wavelength range from about 450 nm to about 495 nm may be less than a transmittance of the yellow filter in a wavelength range of about 500 nm or more.

According to another exemplary implementation of the invention, a photo-luminescent display device includes: a backlight to output a backlight; a first substrate and a second substrate facing each other, the second substrate including a plurality of first recessed portions; a pixel electrode disposed on the first substrate; a light amount control layer disposed in a space between the first substrate and the second substrate to control transmittance of the backlight; a light diffusion portion located on the second substrate and having a second recessed portion; and a first light conversion portion and a second light conversion portion disposed in a respective one of the first recessed portions to convert a wavelength of the backlight.

A height of the first light conversion portion disposed in one of the plurality of the first recessed portions and a height of the second light conversion portion disposed in another one of the plurality of the first recessed portions may be substantially equal to a height of the light diffusion portion.

The photo-luminescent display device may further include a first color filter and a second color filter, the first color filter being located between the first light conversion portion and the second substrate and the second color filter being located between the second light conversion portion and the second substrate.

The photo-luminescent display device may further include a light transmission portion disposed in the second recessed portion between the second substrate and the light diffusion portion.

The light amount control layer may include a liquid crystal layer.

According to another exemplary implementation of the invention, a method of manufacturing a photo-luminescent display device includes: forming a light diffusion portion on a substrate; defining a plurality of first recessed portions by removing a part of the light diffusion portion; depositing a droplet comprising a phosphor at the plurality of the first recessed portions by using an inkjet nozzle located at the plurality of the first recessed portions; and forming a light conversion portion including the phosphor by drying the deposited droplet.

The method may further include forming a light transmission portion between the substrate and the light diffusing portion before forming the light diffusion portion on the substrate.

The method may further include forming a color filter between the substrate and the light diffusion portion before forming the light diffusion portion on the substrate.

The color filter may be a yellow filter. A transmittance of the yellow filter in a wavelength range from about 450 nm to about 495 nm is less than a transmittance of the yellow filter in a wavelength range of about 500 nm or more. in a wavelength range from about in a wavelength range from about 450 nm to about 495 nm may be less than a transmittance of the yellow filter in a wavelength range of about 500 nm or more.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
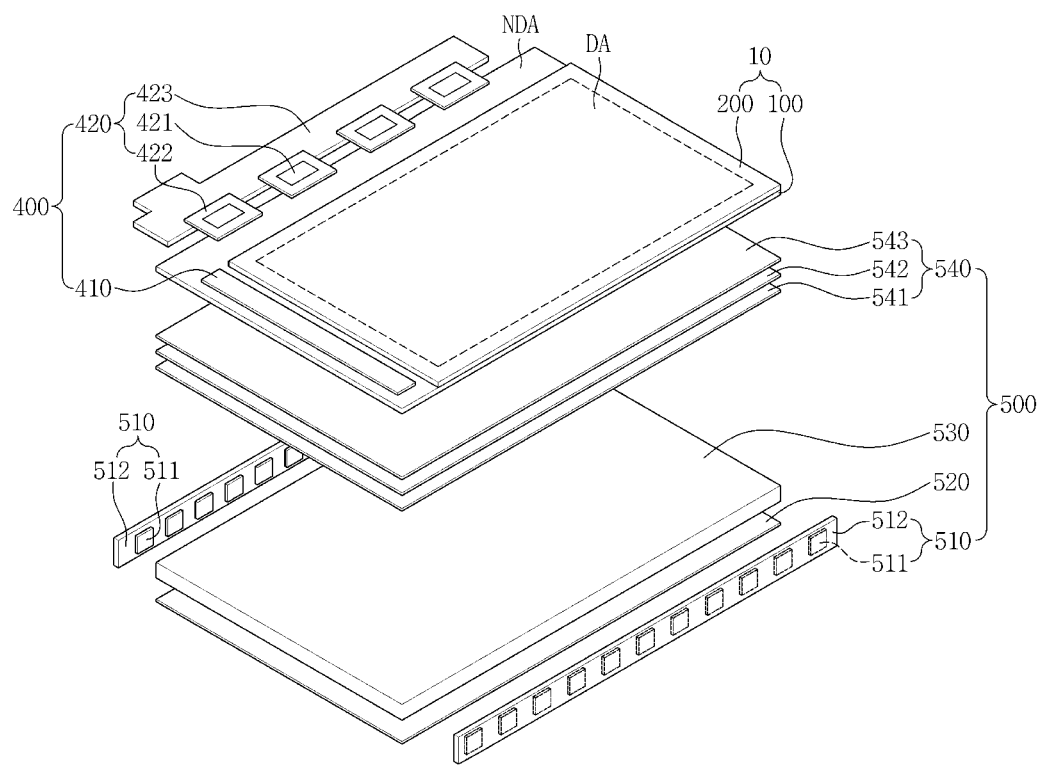
FIG. 1 is an exploded perspective view illustrating a display device constructed according to an exemplary embodiment of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is an exploded perspective view illustrating a display device constructed according to an exemplary embodiment of the invention.

Referring to FIG. 1, the display device includes a display panel 10, a driver 400 and a backlight portion 500.

The display panel 10 may include a back panel 100, a front panel 200 and a light amount control layer (not illustrated in FIG. 1) between the back panel 100 and the front panel 200. The display panel 10 may include a display area DA on which images may be displayed and a non-display area NDA around the display area DA.

Any layer that may control a transmittance of light provided from the backlight portion 500 may be used as the light amount control layer of the display panel 10. For example, the light amount control layer may include one of a liquid crystal layer, an electro-wetting layer and an electrophoresis layer. Hereinafter, the light amount control layer will be described on the premise that it is a liquid crystal layer by way of non-limiting example only. In such an exemplary embodiment, the display device according to the exemplary embodiment may be referred to as a liquid crystal display ("LCD") device.

The driver 400 may include a gate driver 410 and a data driver 420. The gate driver 410 may be disposed at the non-display area NDA of the display panel 10. The gate driver 410 generates gate signals according to a gate control signal provided from a timing controller (not illustrated) and sequentially applies the gate signals to a plurality of gate lines.

The data driver 420 may include a plurality of data driving integrated circuits (ICs) 421, a carrier 422 on which the data driving IC 421 is mounted, a printed circuit board 423, and the like. The data driving ICs 421 receive digital image data signals and a data control signal from the timing controller and apply the digital image data signals and the data control signal to data lines.

The backlight portion 500 may include a light source portion 510, a reflection plate 520, a light guide plate 530, an optical sheet 540, and the like. The light source portion 510 generates light. The light generated in the light source portion 510 is provided to the display panel 10 through the light guide plate 530 and the optical sheet 540.

The light source portion 510 may include at least one light source 511 and a light source circuit board 512. For example, the light source 511 may provide blue light to the display panel 10 through the light guide plate 530, the optical sheet 540, and the like. The optical sheet 540 diffuses and collimates the light transmitted from the light guide plate 530. The optical sheet 540 may include a diffusion sheet 541, a collimation sheet 542, a protection sheet 543, and the like.

Figure 2:
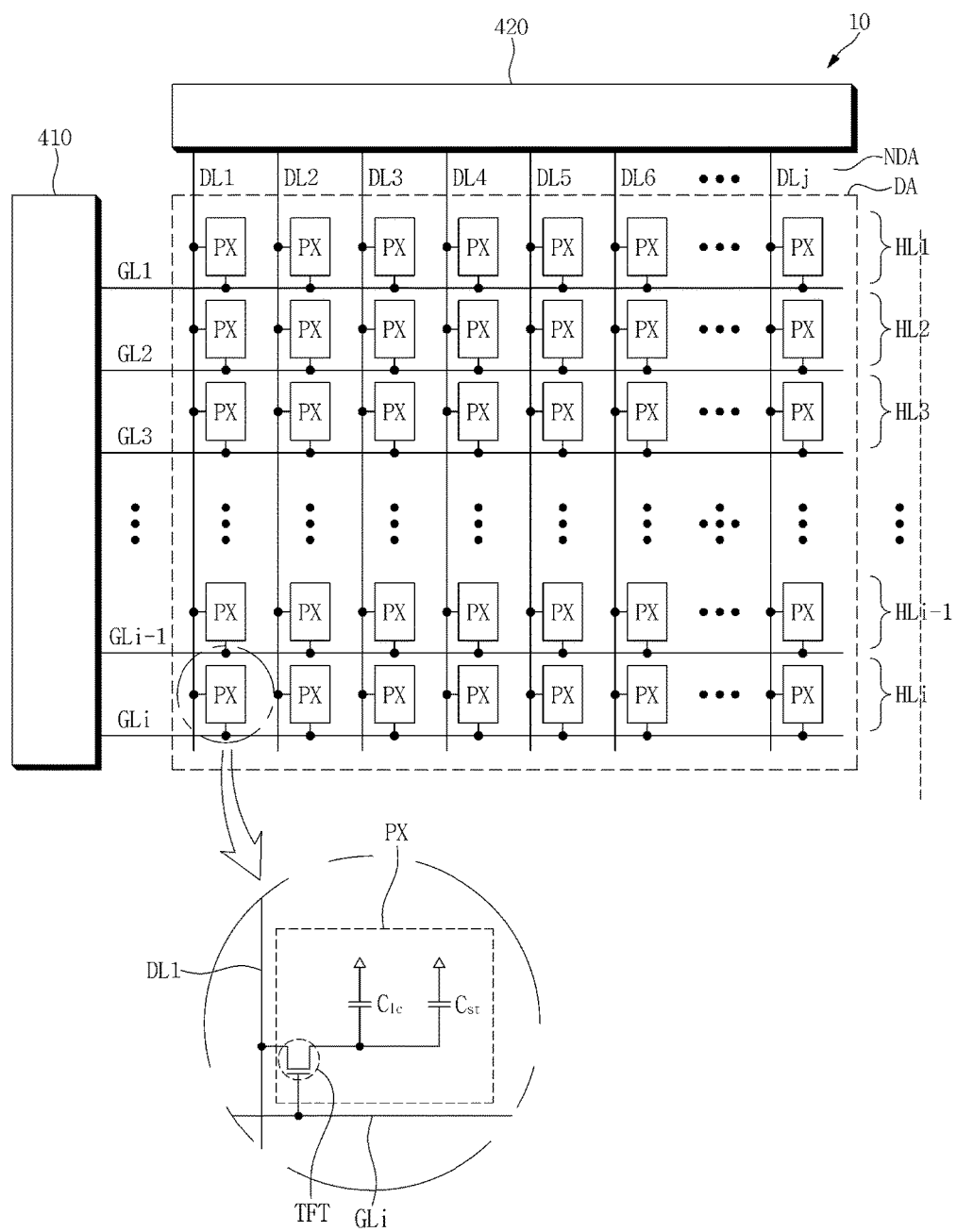
FIG. 2 is an schematic plan view illustrating pixels arranged in a display panel according to an exemplary embodiment.

FIG. 2 is a schematic plan view illustrating pixels arranged in the display panel according to an exemplary embodiment.

Referring to FIGS. 1 and 2, the display panel 10 includes a plurality of gate lines GL1 to GLi and a plurality of data lines DL1 to DLj. The data lines DL1 to DLj intersect the gate lines GL1 to GLi. The gate lines GL1 to GLi extend to the non-display area NDA and are connected to the gate driver 410. The data lines DL1 to DLj extend to the non-display area NDA and are connected to the data driver 420.

As illustrated in FIG. 2, pixels PX are located at the display area DA of the display panel 10. A plurality of pixels PX adjacent to each other may form one unit pixel. For example, a plurality of adjacent pixels PX that are connected to the same gate line may form one unit pixel.

Adjacent pixels PX may be respectively connected to different data lines. As in one example illustrated in FIG. 2, one pixel PX may be connected to an odd-numbered data line and another pixel PX adjacent to said one pixel PX may be connected to an even-numbered data line.

In an exemplary embodiment, j number of pixels (hereinafter, n-th horizontal line pixels) arranged along an n-th (n being one selected from 1 to i) horizontal line are individually connected to the first to j-th data lines DL1 to DLj, respectively. In addition, the n-th horizontal line pixels are connected in common to an n-th gate line. Accordingly, the n-th horizontal line pixels receive an n-th gate signal as a common signal. That is, j number of pixels in the same horizontal line all receive a same gate signal, while pixels in different horizontal lines receive different gate signals, respectively. For example, pixels PX in a first horizontal line HL1 all receive a first gate signal, while pixels PX in a second horizontal line HL2 all receive a second gate signal that has a timing which is different from a timing of the first gate signal.

As shown in the enlarged call out in FIG. 2, a thin film transistor is turned on in response to a gate signal applied from the gate line GLi. A turned-on thin film transistor transmits an analog image data signal provided from the data line DL1 to a pixel electrode.

A liquid crystal capacitance Clc may be formed between the pixel electrode and an opposing electrode, which face each other, and a storage capacitor Cst may be formed between the pixel electrode and a storage line which oppose each other.

Figure 3:
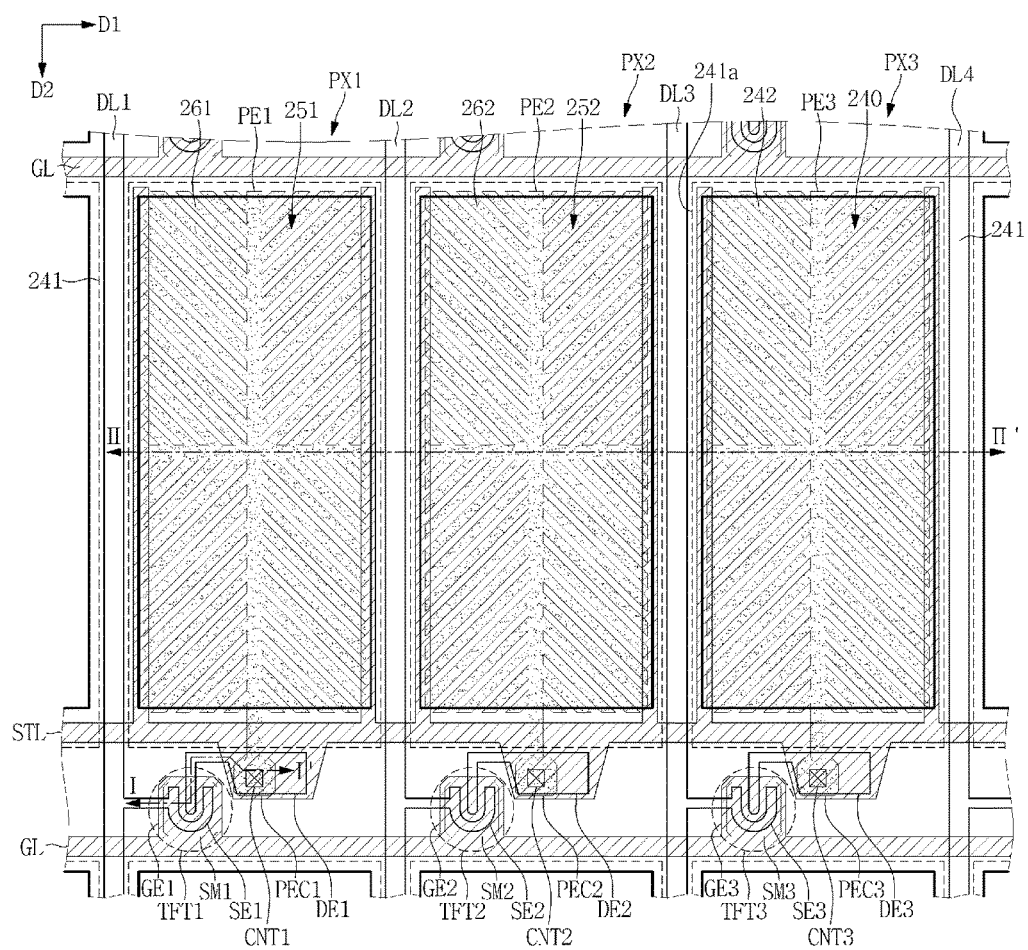
FIG. 3 is a plan view illustrating three adjacently arranged pixels of FIG. 2.
Figure 4:
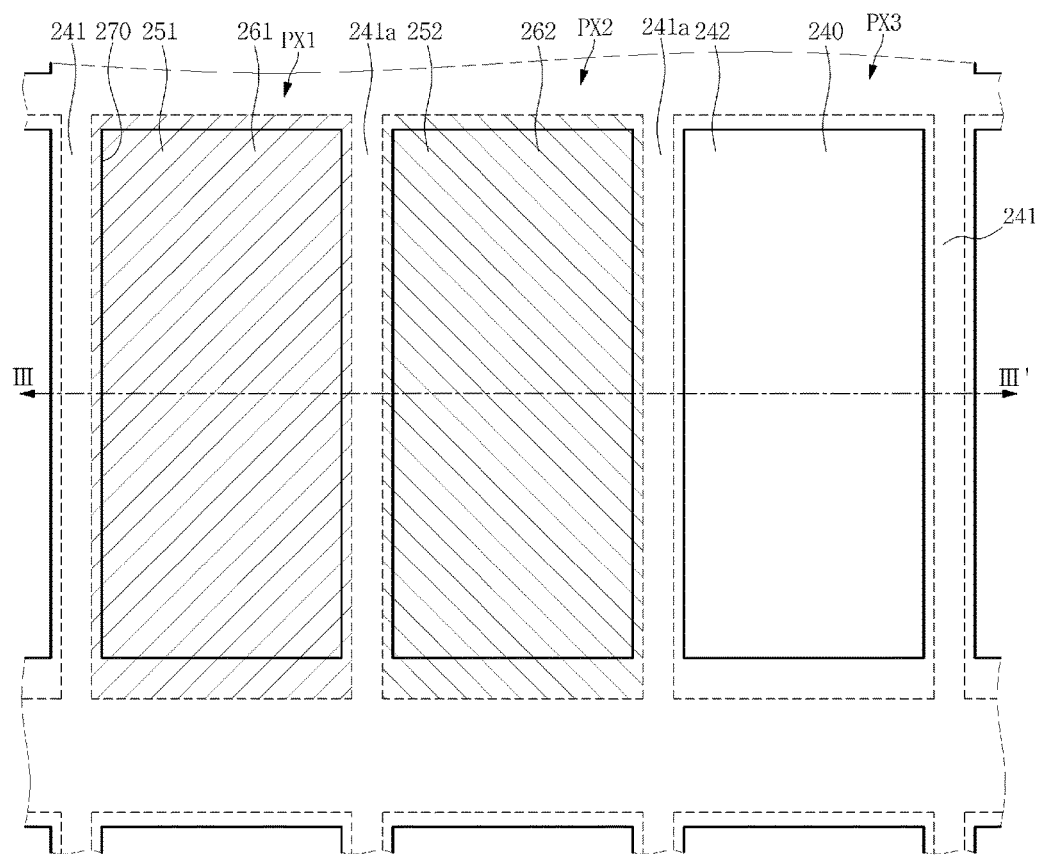
FIG. 4 is a plan view schematically illustrating only a light conversion portion on an opposing substrate of FIG. 3.
Figure 5:
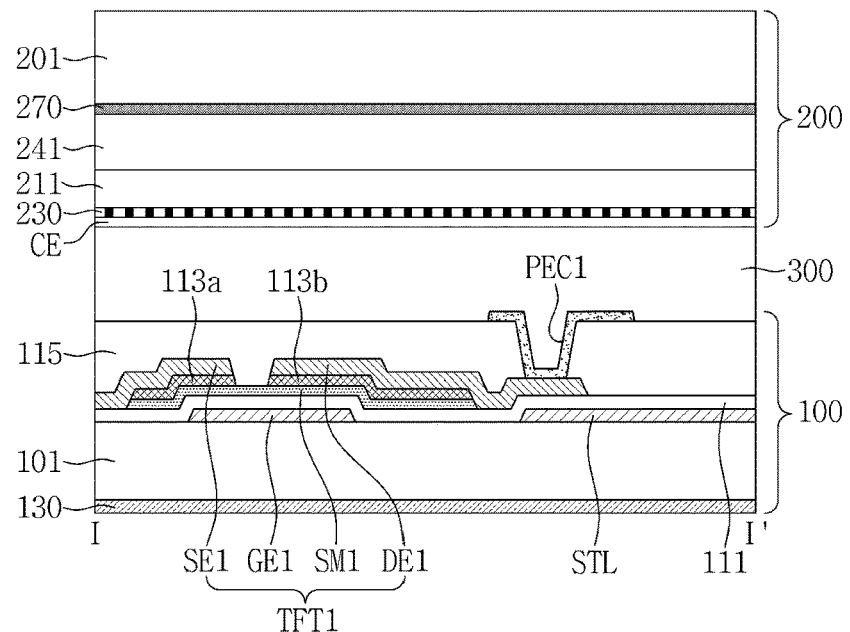
FIG. 5 is a cross-sectional view taken along the line I-I' of FIG. 3.
Figure 6:
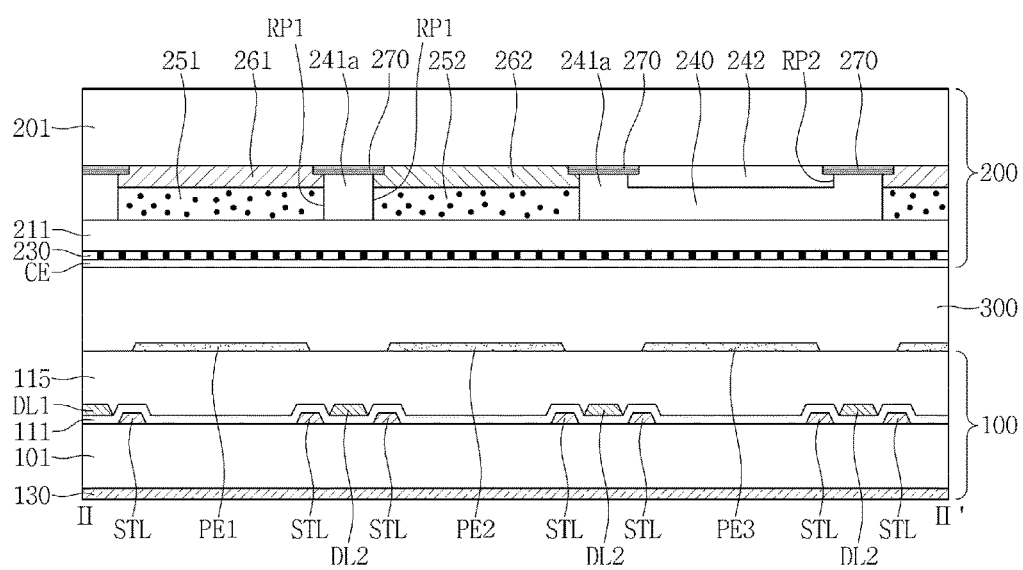
FIG. 6 is a cross-sectional view taken along the line II-II' of FIG. 3.

FIG. 3 is a plan view illustrating three adjacently arranged pixels of FIG. 2, FIG. 4 is a plan view schematically illustrating only a light conversion portion on an opposing substrate of FIG. 3, FIG. 5 is a cross-sectional view taken along the line I-I' of FIG. 3, and FIG. 6 is a cross-sectional view taken along the line II-I' of FIG. 3.

Referring to FIGS. 3, 4 and 5, the display panel 10 according to an exemplary embodiment may include the back panel 100, the front panel 200 and the light amount control layer 300 between the back panel 100 and the front panel 200.

The back panel 100 may include a first substrate 101, a gate line GL disposed on the first substrate 101 and extending in a first direction D1, a storage line STL spaced apart from the gate line GL, data lines DL1, DL2, DL3 and DL4 disposed on the first substrate 101 and extending in a second direction D2 which crosses the first direction D1, first, second and third thin film transistors TFT1, TFT2 and TFT3 connected to the gate line GL and respective ones of the data lines DL1, DL2 and DL3, first, second and third pixel electrodes PE1, PE2 and PE3 connected to respective ones of the first, second and third thin film transistors TFT1, TFT2 and TFT3, a gate insulating layer 111, a protection layer 115, a first polarization plate 130, and the like. The set of three pixels may be repeated in each row, for example, HL1.

In the back panel 100, the first pixel electrode PE1 corresponds to a first pixel PX1, the second pixel electrode PE2 corresponds to a second pixel PX2 and the third pixel electrode PE3 corresponds to a third pixel PX3.

The first pixel PX1, the second pixel PX2 and the third pixel PX3 display different colors.

Hereinafter, it is assumed that the first pixel PX1 displays red, the second pixel PX2 displays green and the third pixel PX3 displays blue.

The first substrate 101 may include a transparent material such as glass or plastic.

A gate wiring is disposed on the first substrate 101, the gate wiring including the gate line GL extending in the first direction D1, first, second and third gate electrodes GE1, GE2 and GE3 branching from the gate line GL and a storage line STL spaced apart from the gate line GL.

The storage line STL may extend in the first direction D1 and the second direction D2 which intersects the first direction D1. The storage line STL may externally receive a DC voltage. The storage line STL overlaps parts of the first, second and third pixel electrodes PE1, PE2 and PE3 to form a storage capacitance Cst with the first, second and third pixel electrodes PE1, PE2 and PE3.

The gate wiring may include or be formed of aluminum (Al) or alloys thereof, silver (Ag) or alloys thereof, copper (Cu) or alloys thereof and/or molybdenum (Mo) or alloys thereof. In addition, the gate wiring may include or be formed of one of chromium (Cr), tantalum (Ta) and titanium (Ti). In an exemplary embodiment, the gate wiring may have a multilayer structure including at least two conductive layers having different physical properties from each other.

The gate insulating layer 111 is disposed over an entire surface of the first substrate 101 on which the gate wiring is disposed. The gate insulating layer 111 may include silicon nitride (SiNx), silicon oxide (SiOx), or the like. In an exemplary embodiment, the gate insulating layer 111 may have a multilayer structure including at least two insulating layers having different physical properties.

First, second and third semiconductor layers SM1, SM2 and SM3 are disposed on the gate insulating layer 111.

The first, second and third semiconductor layers SM1, SM2 and SM3 may be disposed so as to respectively overlap the first, second and third gate electrodes GE1, GE2 and GE3 below the gate insulating layer 111. The first, second and third semiconductor layers SM1, SM2 and SM3 may include amorphous silicon, polycrystalline silicon, or the like.

A data wiring is disposed on the first, second and third semiconductor layers SM1, SM2 and SM3, the data wiring including the first, second and third data lines DL1, DL2 and DL3 extending in the second direction D2 which crosses the first direction D1, first, second and third source electrodes SE1, SE2 and SE3 branching from the first, second and third data lines DL1, DL2 and DL3, respectively, and first, second and third drain electrodes DE1, DE2 and DE3 spaced apart from the first, second and third source electrodes SE1, SE2 and SE3, respectively.

Ohmic contact layer 113a may be further disposed between the semiconductor layers SM1, SM2 and SM3 and the source electrodes SE1, SE2 and SE3, and Ohmic contact layer 113b may be further disposed between the semiconductor layers SM1, SM2 and SM3 and the drain electrodes DE1, DE2 and DE3. The ohmic contact layers 113a and 113b may include silicide or n+ hydrogenated amorphous silicon doped with n-type impurity ions, e.g., phosphorus (P), at high concentration.

The data wiring may include a material substantially the same as a material included in the gate wiring.

The first thin film transistor TFT1 may include the first gate electrode GE1, the first semiconductor layer SM1, the first source electrode SE1 and the first drain electrode DE1, the second thin film transistor TFT2 may include the second gate electrode GE2, the second semiconductor layer SM2, the second source electrode SE2 and the second drain electrode DE2, and the third thin film transistor TFT3 may include the third gate electrode GE3, the third semiconductor layer SM3, the third source electrode SE3 and the third drain electrode DE3.

The protection layer 115 is disposed over an entire surface of the first substrate 101 on which the first, second and third thin film transistors TFT1, TFT2 and TFT3 are formed. The protection layer 115 may include an inorganic insulating material such as silicon nitride (SiNx) or silicon oxide (SiOx).

The first, second and third pixel electrodes PE1, PE2 and PE3 are located on the protection layer 115. In such an exemplary embodiment, the first, second and third pixel electrodes PE1, PE2 and PE3 may be connected to the first, second and third drain electrodes DE1, DE2 and DE3 through contact holes CNT1, CNT2 and CNT3 of the protection layer 115, respectively. Hereinafter, structures branching off from the first, second and third pixel electrodes PE1, PE2 and PE3 to connect the first, second and third pixel electrodes PE1, PE2 and PE3 and the first, second and third drain electrodes DE1, DE2 and DE3 will be referred to as first, second and third pixel electrode contact portions PEC1, PEC2 and PEC3.

The first, second and third pixel electrodes PE1, PE2 and PE3 and the first, second and third pixel electrode contact portions PEC1, PEC2 and PEC3 may include a transparent conductive material such as indium tin oxide (ITO) or indium zinc oxide (IZO). In such an exemplary embodiment, ITO may be a polycrystalline or monocrystalline material, and IZO may be a polycrystalline or monocrystalline material as well.

The first polarization plate 130 is located on a rear surface of the first substrate 101.

Referring to FIG. 6, the front panel 200 may include a second substrate 201, a light diffusion portion 240, a barrier grid 241, a light transmission portion 242, a first light conversion portion 251, a second light conversion portion 252, a first color filter 261, a second color filter 262, a black matrix 270, a planarization layer 211, a second polarization plate 230, a common electrode CE, and the like.

The barrier walls 241a of the barrier grid 241 divide the light emission area of the pixel PX in a grid-like shape that defines a plurality of first recessed portions RP1 at light emission areas of a first pixel PX1 and a second pixel PX2. The light transmission portion 242 is disposed in a second recessed portion RP2 defined in the light diffusion portion 240.

The second substrate 201 may include a transparent material such as glass or plastic.

The first light conversion portion 251, the second light conversion portion 252 and the light diffusion portion 240 may be disposed on the second substrate 201. The first light conversion portion 251 may be located corresponding to the first pixel electrode PE1, the second light conversion portion 252 may be located corresponding to the second pixel electrode PE2, and the light diffusion portion 240 may be located corresponding to the third pixel electrode PE3.

The first light conversion portion 251, the second light conversion portion 252 and the light diffusion portion 240 may have, when viewed in plan, an island shape or a stripe s shape extending in the second direction D2.

The first light conversion portion 251 may include a red phosphor, the second light conversion portion 252 may include a green phosphor and the light diffusion portion 240 may include at least one of a reflecting element and a scattering element.

The red and green phosphors convert the wavelength of light to output light of a specific wavelength. The wavelength of the light to be output varies depending on the size of the phosphor. That is, light may be output with different wavelengths depending on a diameter of the phosphor.

The phosphor may have a diameter of about 2 nm or more and about 13 nm or less. In general, when the phosphor has a small diameter, the wavelength of the output light is shortened and a blue-based light is output. When a diameter of the phosphor increases, the wavelength of the output light is lengthened and a red-based light is output.

For example, a phosphor having a diameter of about 10 nm may output a red light, a phosphor having a diameter of about 7 nm may output a green light and a phosphor having a diameter of about 5 nm may output a blue light. Phosphors outputting red light are referred to as red phosphors, phosphors outputting green light are referred to as green phosphors and phosphors outputting blue light are referred to as blue phosphors.

The phosphor may include at least one material selected from the group consisting of a quantum dot, a quantum rod and a tetrapod quantum dot.

Since having a high quantum yield and a high extinction coefficient as compared to those of general fluorescent dyes, the quantum dots may generate significantly intense fluorescent light. In particular, the quantum dots may absorb light of a short wavelength to output light of a longer wavelength.

The quantum dots may have a structure including a core nanocrystal and a shell nanocrystal surrounding the core nanocrystal. In addition, the quantum dots may include an organic ligand bonded to the shell nanocrystal and may further include an organic coating layer surrounding the shell nanocrystal.

The shell nanocrystal may have two or more layers. The shell nanocrystal is formed on a surface of the core nanocrystal.

The quantum dots may include at least one substance of group II compound semiconductors, group III compound semiconductors, group V compound semiconductors and group VI compound semiconductors. For example, the core nanocrystal forming the quantum dot particle may include at least one of: CdSe, CdS, CdTe, ZnS, ZnSe, ZnTe, CdSeTe, CdZnS, CdSeS, PbSe, PbS, PbTe, AgInZnS, HgS, HgSe, HgTe, GaN, GaP, GaAs, InP, InZnP, InGaP, InGaN, InAs and ZnO. In addition, the shell nanocrystal may include at least one of: CdS, CdSe, CdTe, CdO, ZnS, ZnSe, ZNSeS, ZnTe, ZnO, InP, InS, GaP, GaN, GaO, InZnP, InGaP, InGaN, InZnSCdSe, PbS, TiO, SrSe and HgSe.

For example, in the case where the core nanocrystal includes CdSe, a blue light may be emitted when the diameter of the quantum dots is about 1 nm or more and about 3 nm or less, a green light may be emitted when the diameter of the quantum dots is about 3 nm or more and about 5 nm or less, and a red light may be emitted when the diameter of the quantum dots is about 7 nm or more and about 10 nm or less.

The green phosphors may output a light having a wavelength of about 500 nm or more and about 580 nm or less. The green phosphor may include or be formed of at least one selected from the group consisting of: a zinc silicon oxide-based phosphor doped with manganese (e.g., $Zn_2SiO_4$:Mn), a strontium gallium sulfide-based phosphor doped with europium (e.g., $SrGa_2S_4$:Eu) and a barium silicon oxide chloride-based phosphor doped with europium (e.g., $Ba_5Si_2O_7Cl_4$:Eu). For example, the green phosphor may include or be formed of at least one selected from the group consisting of: $YBO_3$:Ce,Tb, $BaMgAl_{10}O_{17}$:Eu,Mn, (Sr,Ca,Ba)(Al,Ga)$_2S_4$:Eu, ZnS:Cu, $AlCa_8Mg(SiO_4)_4Cl_2$:Eu,Mn, $Ba_2SiO_4$:Eu, $(Ba,Sr)_2SiO_4$:Eu, $Ba_2(Mg,Zn)Si_2O_7$:Eu, $(Ba,Sr)Al_2O_4$:Eu, $Sr_2Si_3O_8 \cdot 2SrCl_2$:Eu, $(Sr,Ca,Ba,Mg)P_2O_7N_8$:Eu,Mn, $(Sr,Ca,Ba,Mg)_3P_2O_8$:Eu,Mn, $Ca_3Sc_2Si_3O_{12}$:Ce, $CaSc_2O_4$:Ce, b-SiAlON:Eu, $Ln_2Si_3O_3N_4$:Tb and $(Sr,Ca,Ba)Si_2O_2N_2$:Eu.

The red phosphor may output a light having a wavelength of about 580 nm or more to about 670 nm or less. The red phosphor may include at least one selected from the group consisting of: a nitride-based red phosphor, a fluoride-based red phosphor, a silicate-based red phosphor, a sulfide-based red phosphor, a selenide-based red phosphor, an oxynitride-based red phosphor, a molybdate-based red phosphor, a tantalate-based red phosphor, carbido-nitride, a tungstate-based red phosphor, $Sr_2MgAl_{22}O_{36}$:Mn$^{4+}$, $(Ba,Sr,Ca)_2MgAl_{16}O_{27}$:Eu$^{2+}$, $(Ba,Sr,Ca)_2MgAl_{16}O_{27}$:Mn$^{2+}$, $Sr_4Al_{14}O_{460}$:Eu$^{2+}$ and $Mg_4O_5 \cdot 5GeF$:Mn$^{4+}$.

For example, the nitride-based red phosphor may include at least one selected from the group consisting of: (Sr,Ca)AlSiN$_3$:Eu, (Sr,Ca)AlSi(ON)$_3$:Eu, (Sr,Ca)$_2$Si$_5$N$_8$:Eu, (Sr,Ca)$_2$Si$_5$(ON)$_8$:Eu, (Sr,Ba)SiAl$_4$N$_7$:Eu, CaAlSiN$_3$:Eu$^{2+}$, (Sr,Ca)AlSiN$_3$:Eu$^{2+}$ and Sr$_2$Si$_5$N$_8$:Eu$_2$.

The fluoride-based red phosphor may include at least one selected from the group consisting of: K$_2$SiF$_6$:Mn$^{4+}$, K$_2$TiF$_6$:Mn$^{4+}$, ZnSiF$_6$:Mn$^{4+}$, Na$_2$SiF$_6$:Mn$^{4+}$ and Mg$_4$O$_5$.5GeF:Mn$^{4+}$.

The molybdate-based red phosphor may include at least one of: LiLa$_1$-xEuxMo$_2$O$_8$ and LiEuMo$_2$O$_8$. The tantalate-based red phosphor may include K(Gd,Lu,Y)Ta$_2$O$_7$:Eu$^{3+}$.

The carbido-nitrides may include Cs(Y,La,Gd)Si(CN$_2$)$_4$:Eu.

The tungstate-based red phosphor may include at least one selected from the group consisting of: Gd$_2$WO$_6$:Eu$^{3+}$, Gd$_2$W$_2$O$_9$:Eu$^{3+}$, (Gd,La)$_2$W$_3$O$_{12}$:Eu$^{3+}$, La$_2$W$_3$O$_{12}$:Eu$^{3+}$, La$_2$W$_3$O$_{12}$:Sm$^{3+}$ and LiLaW$_2$O$_8$:Eu$^{3+}$.

The light diffusion portion 240 may include a white resin. For example, organic polymer materials, such as an acrylic resin, a polyimide resin, a polyamide resin, a polyester resin, an olefin resin and a melamine resin, and inorganic polymer materials, such as polysilane, polysilazane and polysiloxane, may be used as the white resin. A scattering element or a pigment may be added to the white resin to form the light diffusion portion 240, where necessary.

The white pigment may include titanium dioxide, white lead, zinc oxide, lithopone, and the like.

The scattering element may include at least one selected from the group consisting of silica, titanium oxide (TiO$_2$), zirconium oxide (ZrO$_2$), acrylic beads, styrene-acryl beads, melamine beads, polystyrene, polymethylmethacrylate, polyurethane, polycarbonate beads, polyvinyl chloride beads, silicone-based particles and air pores. The scattering element may scatter an incident light to change a propagation path of the light passing through it. The scattering element may have a hollow shape.

The barrier grid 241 is formed from a series of barrier walls 241a located between the first light conversion portion 251, the second light conversion portion 252 and the light diffusion portion 240. In addition, the barrier grid 241 may overlap the black matrix 270. For example, the barrier grid 241 may be located between the first and second light conversion portions 251 and 252, between the second light conversion portion 252 and the light diffusion portion 240, and between the light diffusion portion 240 and the first light conversion portion 251. In addition, the barrier grid 241 may be located on the black matrix 270. The barrier grid 241 may isolate the first color filter 261; the second color filter 262; and the light transmission portion 242 and the light diffusion portion 240 in respective pixels from each other and substantially prevent a color mixture by substantially preventing light emitted from one pixel from being incident into an area of another pixel.

The barrier grid 241 may include a white resin. For example, organic polymer materials, such as an acrylic resin, a polyimide resin, a polyamide resin, a polyester resin, an olefin resin and a melamine resin, and inorganic polymer materials, such as polysilane, polysilazane and polysiloxane, may be used as the white resin. A scattering element or a pigment may be added to the white resin to form the barrier grid 241, where necessary.

The white pigment may include titanium dioxide, white lead, zinc oxide, lithopone, and the like.

The scattering element may include at least one selected from the group consisting of silica, titanium oxide (TiO$_2$), zirconium oxide (ZrO$_2$), acrylic beads, styrene-acryl beads, melamine beads, polystyrene, polymethylmethacrylate, polyurethane, polycarbonate beads, polyvinyl chloride beads, silicone-based particles and air pores. The scattering element may have a hollow shape.

The barrier grid 241 may be formed substantially integrally with the light diffusion portion 240. In the case where the barrier grid 241 is integrally formed with the light diffusion portion 240, the light diffusion portion 240 and the barrier grid 241 are integrally formed (e.g., into a monolithic structure) without forming an interface and the barrier walls 241a located between the first light conversion portion 251 and the second light conversion portions 252 may have a height substantially equal to a height of the light diffusion portion 240.

The black matrix 270 is located between the first color filter 261, the second color filter 262 and the light transmission portion 242. For example, the black matrix 270 may be located between the first color filter 261 and the second color filter 262, between the second color filter 262 and the light transmission portion 242 and between the light transmission portion 242 and the first color filter 261. The black matrix may substantially prevent a color mixture by substantially preventing a light emitted from one pixel from being incident into an area of another pixel.

The black matrix 270 may include a metal thin layer or a laminated thin layer including at least one of chromium, chromium oxide and alumina. The thin layer of the black matrix may be formed by a deposition method such as a sputtering deposition method, an electron beam deposition method, a chemical vapor deposition (CVD) method, and the like, and the quality of the thin layer may vary depending on the deposition method.

Alternatively, the black matrix 270 may include a photosensitive organic material. The photosensitive organic material may be formed by exposure and development methods. In such an exemplary embodiment, the black matrix 270 may include a material which is soluble in a developing solution. However, exemplary embodiments are not limited thereto, and the black matrix 270 may include a non-photosensitive organic material.

The planarization layer 211 is disposed on the first light conversion portion 251, the second light conversion portion 252, the light diffusion portion 240 and the black matrix 270. The planarization layer 211 may planarize an uneven surface therebelow or substantially prevent elution of impurities.

The second polarization plate 230 is disposed on the planarization layer 211. A transmission axis of the second polarization plate 230 and a transmission axis of the first polarization plate 130 are orthogonal to each other and one of these transmission axes is substantially parallel to the gate line GL The second polarization plate 230 may include a polarizer. The polarizer may include a plurality of line patterns arranged parallel to the planarization layer 211 and spaced apart from each other at a predetermined interval. Each line pattern has a straight line shape extending in one direction and has a predetermined width.

The line pattern may include a metal. The polarizer including the plurality of metal line patterns may be referred to as a wire grid polarizer (WGP). The line pattern may include at least one of, for example, aluminum (Al), gold (Au), silver (Ag), copper (Cu), chromium (Cr), iron (Fe) and nickel (Ni).

The polarizer may be formed by methods such as an imprinting method using a mold, and a photolithography method. However, exemplary embodiments are not limited thereto and the polarizer may be formed using a block copolymer.

The common electrode CE is disposed on the second polarization plate 230.

The common electrode CE may be a whole plate electrode including a transparent conductor such as indium tin oxide (ITO) or indium zinc oxide (IZO). However, exemplary embodiments are not limited thereto and the common electrode CE may have a concave-convex shape and/or at least one slit for defining a plurality of domains.

An alignment layer may be further disposed between the pixel electrodes PE1, PE2 and PE3 and the light amount control layer 300 and between the light amount control layer 300 and the common electrode CE.

The light amount control layer 300 may be a liquid crystal layer. The liquid crystal layer may include liquid crystal molecules having a negative dielectric constant and aligned vertically.

Figure 7:
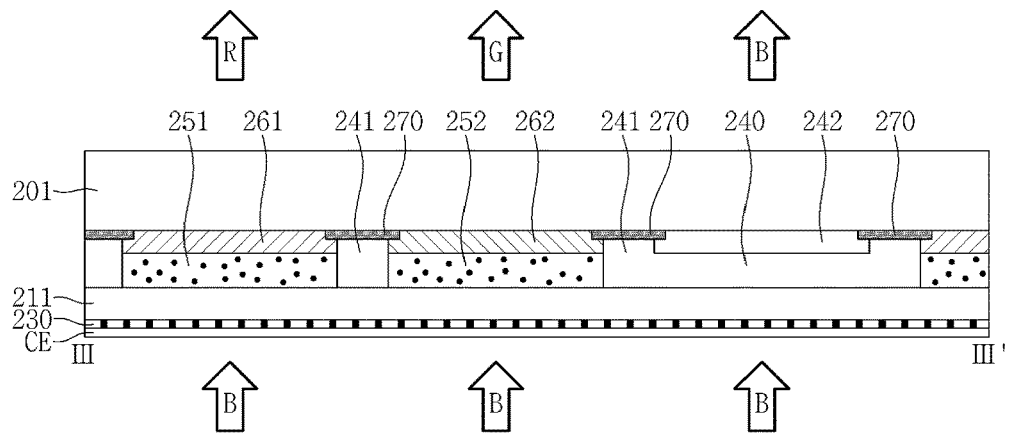
FIG. 7 is a conceptual diagram illustrating operation of the light conversion portion of a front substrate of FIG. 6.

FIG. 7 is a conceptual diagram illustrating operation of the light conversion portion of a front substrate of FIG. 6.

Referring to FIGS. 6 and 7, the front panel 200 includes the second substrate 201, the first light conversion portion 251 for converting a blue light, which is output from the backlight portion 500 and an amount of which is controlled by the light amount control layer 300, into a red light, the second light conversion portion 252 for converting the blue light into a green light, the light diffusion portion 240 not converting the blue light, and the black matrix 270.

The first light conversion portion 251 and the second light conversion portion 252 may include a phosphor that is excited by a blue light. The blue light is a visible light having a wavelength in a range from about 450 nm to about 495 nm.

The first color filter 261 transmits the red light emitted from the first light conversion portion 251 and blocks light other than the red light. The red light is a visible light having a wavelength in a range from about 620 nm to about 780 nm.

The second color filter 262 transmits the green light emitted from the second light conversion portion 252 and blocks light other than the green light. The green light is visible light having a wavelength in a range from about 500 nm to about 565 nm.

The barrier grid 241 divides areas that corresponding to each pixel PX, and separates the first and second light conversion portions 251 and 252 from each other. The barrier grid 241 includes a white resin and the white resin is formed into a semi-transparent state. The transparency of the barrier grid 241 may be controlled by the thickness of the barrier grid 241 and an additive included in the resin. For example, in the case where the thickness of the individual barrier walls 241a, i.e., the distance between the first light conversion portion 251 and the second light conversion portion 252, is about 20 µm, which is set to be an opaque state, a red output light emitted from the first light conversion portion 251 is reflected and blocked at the barrier grid 241 and thus is not incident to an area of the second light conversion portion 252.

The light diffusion portion 240 includes a white resin. The light diffusion portion 240 receives the blue light which is controlled by the light amount control layer 300 and emits the blue light toward a front surface portion of the second substrate 201. The barrier grid 241 may be located between the light diffusion portion 240 and the second light conversion portion 252 and between the light diffusion portion 240 and the first light conversion portion 251. The barrier grid 241 substantially prevents the red light and the green light converted by the first and second light conversion portions 251 and 252, respectively, from being incident to the light diffusion portion 240.

The light diffusion portion 240 may be formed substantially simultaneously with the barrier grid 241 to create a unitary structure. As used herein, two things being formed substantially simultaneously means that they are formed, using a substantially same material, through a substantially same process at a substantially same time. In an exemplary embodiment, a light diffusion portion 240 and a barrier grid 241 adjacent to the light diffusion portion 240 may be unitarily formed (e.g., into a monolithic structure), not having an interface therebetween. The light diffusion portion 240 is formed in a photo-lithography method by using a white photosensitive resin.

The light transmission portion 242 is located between the light diffusion portion 240 and the second substrate 201. The light transmission portion 242 transmits the blue light which has passed through the light diffusion portion 240 to a front surface portion of the second substrate 201. The light transmission portion 242 may include a transparent photosensitive resin.

The light transmission portion 242 is formed in a photo-lithography method in which a pattern is formed by exposing a photosensitive resin to ultraviolet light. In such an exemplary embodiment, ultraviolet rays or laser beams are irradiated to the photosensitive resin applied in a selective manner on the second substrate 201, a portion of the resin is photo-cured by the irradiated light, and a portion of the resin that is not photo-cured is removed through development, such that a pattern of the light transmission portion 242 may be formed. However, the method of forming the light transmission portion 242 is not limited thereto and any method may be employed without limitation. For example, the light transmission portion 242 may be formed in a printing method.

The first and second light conversion portions 251 and 252 are located at light emission areas of the first pixel PX1 and the second pixel PX2, respectively. The first and second light conversion portions 251 and 252 are spaced apart from each other by the barrier grid 241. The first and second light conversion portions 251 and 252 may be formed by an inkjet method.

In the case of an inkjet method, ink solutions including red phosphors and green phosphors are sprayed, through an ink nozzle, into spaces partitioned by the barrier grid 241, respectively, such that the first and second light conversion portions 251 and 252 are formed. The ink solution may have a viscosity for the ink solution to be easily sprayed through the nozzle. In addition, the ink solution, in a liquid phase, which fills the inner space partitioned by the barrier grid 241 has a volume which exceeds the space defined by the barrier wall 241. Subsequently, a thermal-drying process is performed to evaporate a solvent of the ink solution such that the first and second light conversion portions 251 and 252 are formed.

The planarization layer 211 is disposed on the first light conversion portion 251, the second light conversion portion 252, the light diffusion portion 240 and the black matrix 270. The planarization layer 211 planarizes an uneven surface therebelow or substantially prevents the elution of impurities.

The second polarization plate 230 is disposed on the planarization layer 211.

The common electrode CE is disposed on the second polarization layer 230.

Figure 8:
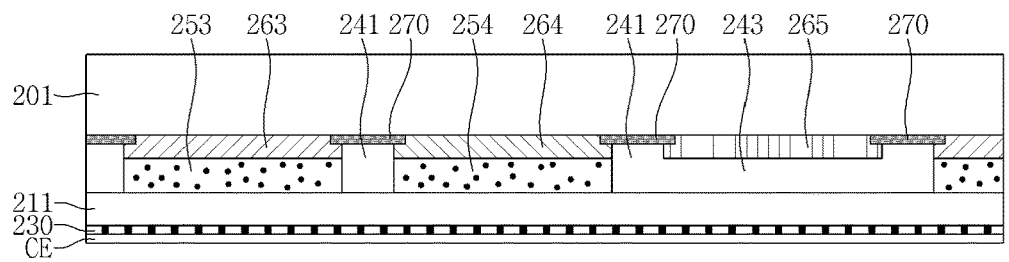
FIG. 8 is a cross-sectional view illustrating a front panel according to another exemplary embodiment.

FIG. 8 is a cross-sectional view illustrating a front panel according to an alternative exemplary embodiment.

Referring to FIG. 8, a front panel 200 includes a second substrate 201, a first color filter 263, a second color filter 264, a third color filter 265, a barrier grid 241, a light diffusion portion 243, a first light conversion portion 253, a second light conversion portion 254, a black matrix 270, a planarization layer 211, a second polarization plate 230 and a common electrode CE.

The black matrix 270 is located on the second substrate 201.

The first color filter 263, the second color filter 264 and the third color filter 265 are located between the black matrixes 270.

The first color filter 263 transmits a red light emitted from the first light conversion portion 253 and blocks light other than the red light. The red light is a visible light having a wavelength from about 620 nm to about 780 nm.

The second color filter 264 transmits a green light emitted from the second light conversion portion 254 and blocks light other than the green light. The green light is a visible light having a wavelength in a range from about 500 nm to about 565 nm.

The third color filter 265 blocks light other than a blue light transmitted through the light diffusion portion 243. The blue light is a visible light having a wavelength in a range from about 450 nm to about 495 nm.

The barrier grid 241 is located on the black matrix 270 and divides a light emission area of a pixel PX, along with the black matrix 270. The barrier grid 241 separates the first light conversion portion 253 and the second light conversion portion 254 from each other.

The barrier grid 241 divides the light emission area of the pixel PX in a '#' shape and defines a recessed portion at light emission areas of a first pixel PX1 and a second pixel PX2.

The light diffusion portion 243 is formed at the light emission area of a blue pixel. The light diffusion portion 243 receives the blue light which is adjusted by the light amount control layer 300 and emits the blue light toward a front surface portion of the second substrate 201.

The light diffusion portion 243 may include a white photosensitive resin and may be formed unitarily with the barrier grid 241 by a photo-lithography method or the like.

The first light conversion portions 253 and the second light conversion portion 254 are located at the light emission areas of the first pixel PX1 and the second pixel PX2, respectively. The first light conversion portions 253 and the second light conversion portion 254 are spaced apart from each other by the barrier grid 241. The first light conversion portion 253 and the second light conversion portion 254 may be formed by an ink jet method. The first light conversion portion 253 may include red phosphors, the second light conversion portion 254 may include green phosphors and the light diffusing portion 243 may include at least one of reflecting elements and scattering elements.

Figure 9:
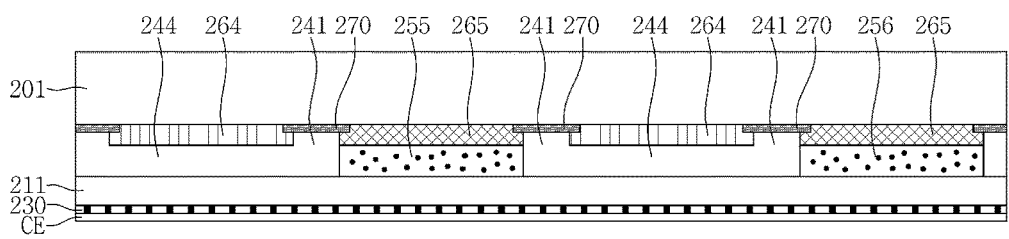
FIG. 9 is a cross-sectional view illustrating a front panel according to another exemplary embodiment.

FIG. 9 is a cross-sectional view illustrating a front panel according to an alternative exemplary embodiment.

Referring to FIG. 9, a front panel 200 includes a second substrate 201, a yellow filter 266, a light diffusion portion 244, a barrier grid 241, a first light conversion portion 255, a second light conversion portion 256, a black matrix 270, a planarization layer 211, a second polarization plate 230 and a common electrode CE.

FIG. 9 is a cross-sectional view illustrating the front panel 200 in which red, green and blue pixels are arranged in the order of a blue pixel-a red pixel-a blue pixel-a green pixel.

Referring to FIG. 9, a first pixel PX1 which outputs a red light is located, on one side of a third pixel PX3, between a fourth pixel PX4 and the third pixel PX3, the fourth pixel PX4 and the third pixel PX3 outputting a blue light. A second pixel PX2 which outputs a green light is located, on another side of the third pixel PX3, between the third pixel PX3 and another fourth pixel PX4 adjacent to the third pixel PX3.

The first pixel PX1 and the second pixel PX2 include a yellow filter 266 located between the black matrixes 270 on the second substrate 201.

The yellow filter 266 is a kind of color filter that may transmit the red light and the green light and block the blue light. In respect of wavelength range, the yellow filter 266 has a relatively low transmittance in a wavelength range from about 450 nm to about 495 nm which corresponds to blue light and has a relatively high transmittance in a wavelength range from about 500 nm to about 565 nm which corresponds to green light and in a wavelength range from about 620 nm to about 780 nm which corresponds to red light.

The yellow filter 266 is located at areas of the first pixel PX1 and the second pixel PX2 of the second substrate 201 such that the blue light output from the backlight portion 500 may be prevented from being emitted through the first pixel PX1 and the second pixel PX2.

The third pixel PX3 and the fourth pixel PX4 include a third color filter 267 on the second substrate 201 between the black matrixes 270. The third color filter 267 blocks light other than the blue light transmitted through the light diffusion portion 244.

The barrier grid 241 is located on the black matrix 270 and divides a light emission area of the pixel PX, along with the black matrix 270. The barrier grid 241 separates the first light conversion portion 255, the second light conversion portion 256, and the light diffusion portion 244 from each other. The light diffusion portion 244 is formed at the third pixel PX3 and the fourth pixel PX4 and receives the blue light adjusted by the light amount control layer 300 to be emitted toward a front surface portion of the second substrate 201.

The light diffusion portion 244 may include a white photosensitive resin and may be formed unitarily with the barrier grid 241 by a photo-lithography method or the like.

The planarization layer 211 is disposed on the first light conversion portion 255, the second light conversion portion 256, the light diffusion portion 244 and the black matrix 270. The planarization layer 211 planarizes an uneven surface therebelow or substantially prevents the elution of impurities.

The second polarization plate 230 is disposed on the planarization layer 211.

The common electrode CE is disposed on the second polarization layer 230.

In the embodiment illustrated in FIG. 9, the yellow filter 266 located at the first pixel PX1 and the second pixel PX2 in a pixel array structure including four pixels is described by way of example, but the yellow filter 266 may be applied to display panels having a pixel arrangement of red-green-blue.

FIGS. 10A, 10B, 10C, 10D, 10E, 10F, 10G, 10H, 10I and 10J are cross sectional views schematically illustrating a process of manufacturing the front panel according to an exemplary embodiment.

Figure 10A:
FIGS. 10A, 10B, 10C, 10D, 10E, 10F, 10G, 10H, 10I and 10J are cross sectional views schematically illustrating a process of manufacturing the front panel according to an exemplary embodiment.
Figure 10B:
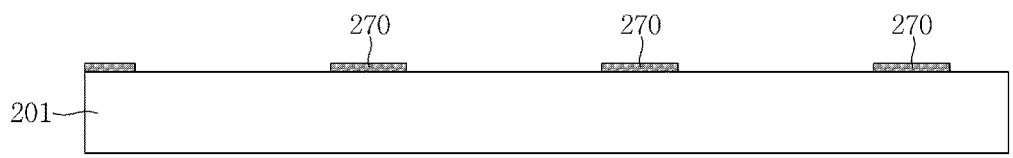

First, referring to FIGS. 10A and 10B, a metal thin layer including chromium may be formed on the second substrate 201. Alternatively, a photosensitive organic material including a black pigment may be applied.

A portion of the applied metal or organic thin layer corresponding to the black matrix 270 remains and another portion of the applied metal or organic thin layer is removed from the second substrate 201 through a patterning process including, for example, photo-etching, laser patterning, exposure, development and the like.

The black matrix 270 may include a photosensitive organic material. In such an exemplary embodiment, the black matrix 270 may include a material which is soluble in a developing solution. Alternatively, the black matrix 270 may include a non-photosensitive organic material.

Alternatively, the black matrix 270 may be patterned on the second substrate 201 by a deposition process using a mask.

Figure 10C:
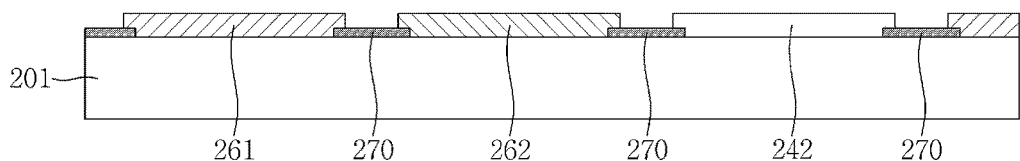

FIG. 10C shows a process of manufacturing the color filter and the light transmission portion.

The first color filter 261 may include a photosensitive resin including a red pigment. The photosensitive resin including a pigment that blocks visible light other than the light in a wavelength range from about 620 nm to about 780 nm, which corresponds to red light, is applied over an entire surface, processes of exposure, development, and the like are performed, such that the first color filter 261 may be formed. The manufacturing process of the color filter may employ techniques known to those skilled in the pertinent art.

The second color filter 262 may include a photosensitive resin including a green pigment. The photosensitive resin included in the second color filter 262 may include a pigment that may block visible light other than the light in a wavelength range from about 500 nm to about 565 nm, which corresponds to green light.

The light transmission portion 242 may include a transparent photosensitive resin including no pigment.

Each of the first color filter 261, the second color filter 262 and the light transmission portion 242 is formed through processes of exposure, development, and the like.

Figure 10D:
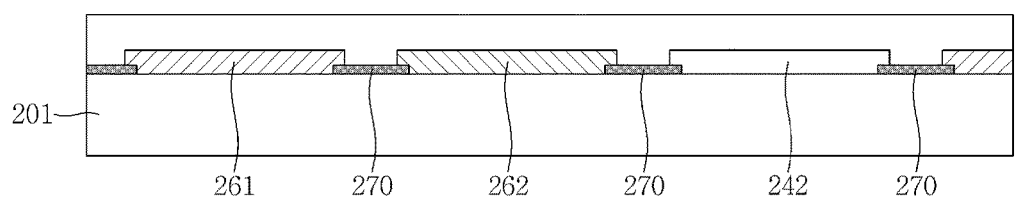
Figure 10E:
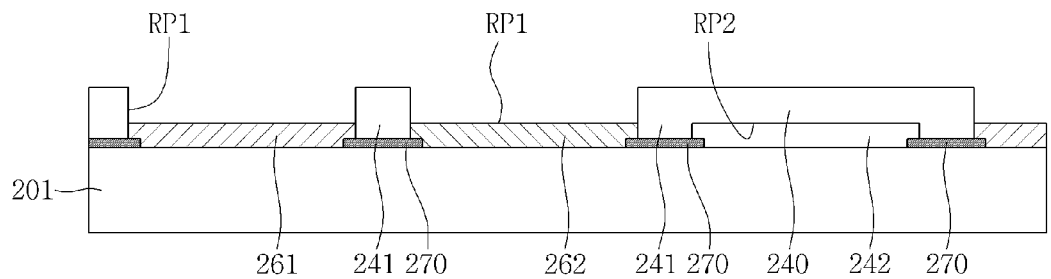

FIGS. 10D and 10E show a process of manufacturing the barrier grid and the light diffusion portion.

Referring to FIGS. 10D and 10E, a photosensitive resin forming the light diffusion portion 240 and the barrier grid 241 is applied over an entire surface of the second substrate 201. For example, the photosensitive resin covers upper portions of the black matrix 270, the first color filter 261, the second color filter 262 and the light transmission portion 242 on the second substrate 201.

Areas other than areas corresponding to the first color filter 261 and the second color filter 262 of the photosensitive resin layer illustrated in FIG. 10D, that is, areas corresponding to the barrier grid 241 and the light diffusion portion 240 are cured by light exposure. The photosensitive resin layer applied on the first color filter 261 and the second color filter 262 is removed through a developing process after the light exposure.

As illustrated in FIG. 10E, the photosensitive resin layer is removed, and the barrier grid 241 and the light diffusion portion 240 are formed integrally to create a monolithic structure. The light diffusion portion 240 is formed on the light transmission portion 242. The barrier grid 241 is formed on the black matrix 270 and is integrally formed with the light diffusion portion 240. Respective spaces defined by the barrier walls of the barrier grid 241 surround the first color filter 261 and the second color filter 262.

In an alternative exemplary embodiment, the photosensitive resin layer may remain on the first color filter 261 and the second color filter 262 so that the barrier grid may not over-etched when removing the photosensitive resin layer. The remaining photosensitive resin layer may partially remain in an area adjacent to the barrier grid, or may cover both the upper portion of the first color filter 261 and the upper portion of the second color filter 262. The photosensitive resin layer may form a thin layer having a thickness in a range from several nanometers to several hundred nanometers, thus having a high transmittance and not causing a change in hue.

Figure 10F:
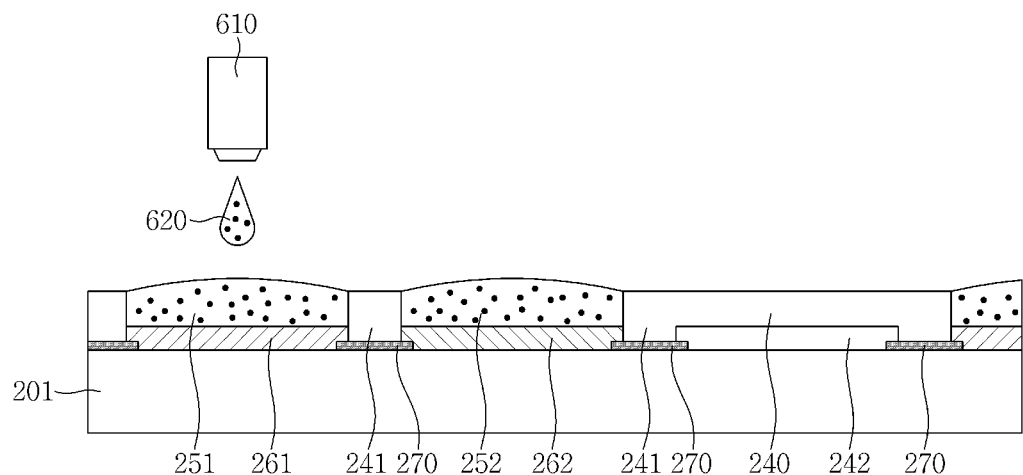
Figure 10G:
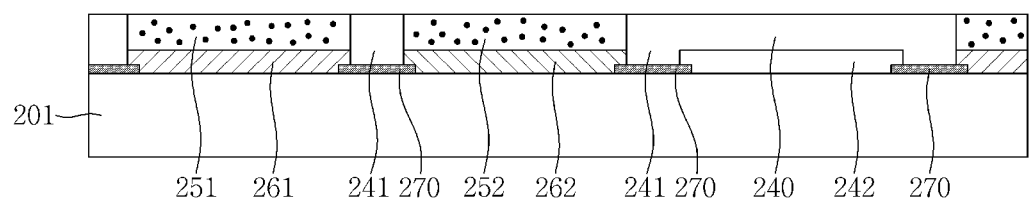

FIGS. 10F and 10G show a process of manufacturing the first and second light conversion portions 251 and 252 through an inkjet process.

Referring to FIGS. 10F and 10G, an inkjet nozzle 610 injects a droplet 620 into a space defined by the barrier grid 241. The first color filter 261 or the second color filter 262 is located on a bottom surface of the space partitioned by the barrier grid 241. The droplet 620 includes one type of red phosphors and green phosphors. The inkjet nozzle 610 moves on the second substrate 201 in a longitudinal direction or a transverse direction to inject the droplet 620 including the red phosphors at a position corresponding to the first color filter 261.

The droplet 620 includes a solvent, a dispersant and a phosphor and has a viscosity for the droplet 620 to be applied by a nozzle. An injection amount of the droplet 620 is determined in consideration of a surface tension and an amount of volume shrinkage after the solvent is dried. In an exemplary embodiment, the droplet 620 is deposited so that a height of the droplet 620 is greater than or equal to a height of the barrier grid 241 in consideration of the surface tension. However, the deposit amount of the droplet 620 is determined so that the droplet 620 injected into one pixel may not flow into an area of another pixel adjacent to said one pixel over the barrier grid 241.

A deposited portion of the droplet 620 is thermally dried to form the first light conversion portion 251 and the second light conversion portion 252.

It is preferable that heights of the first and second light conversion portions 251 and 252 be substantially equal to the height of the barrier grid 241 adjacent thereto.

Figure 10H:
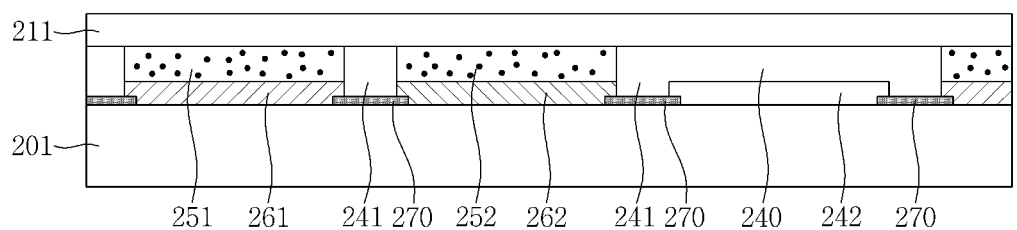

FIG. 10H shows a process of forming the planarization layer 211 on the second substrate 201.

Referring to FIG. 10H, the planarization layer 211 is located on the first light conversion portion 251, the second light conversion portion 252, the light diffusion portion 240, and the barrier grid 241.

The planarization layer 211 compensates for a step difference between the first light conversion portion 251, the second light conversion portion 252, the light diffusion portion 240, and the barrier grid 241 to provide a planar surface and substantially prevent elution of impurities. The planarization layer 211 may include an acrylic resin, a polyamide resin, a polycarbonate resin, or the like having a sufficient hardness and an excellent light transmittance to protect the light conversion portions 251 and 252 and the light diffusion portion 240.

Figure 10I:
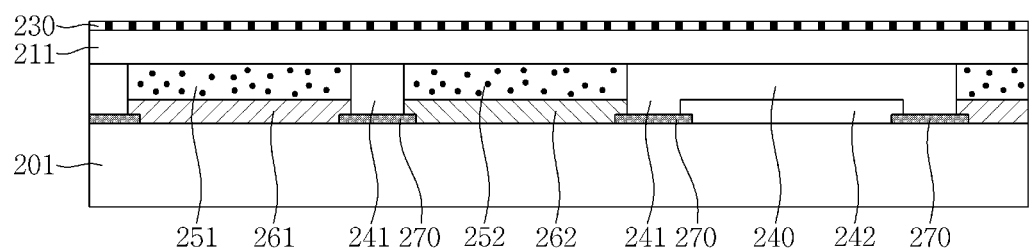

FIG. 10I shows a process of forming the polarization plate on the front substrate.

Referring to FIG. 10I, the second polarization plate 230 is disposed on the planarization layer 211.

The second polarization plate 230 may include a polarizer. The polarizer includes a plurality of line patterns arranged parallel to the planarization layer 211 and spaced apart from each other at a predetermined interval. Each line pattern has a straight line shape extending in one direction and has a predetermined width.

The line pattern may include a metal. A polarizer including a plurality of line patterns including metal is also referred to as a wire grid polarizer (WGP). The line pattern may include at least one of, for example, aluminum (Al), gold (Au), silver (Ag), copper (Cu), chromium (Cr), iron (Fe) and nickel (Ni).

Figure 10J:
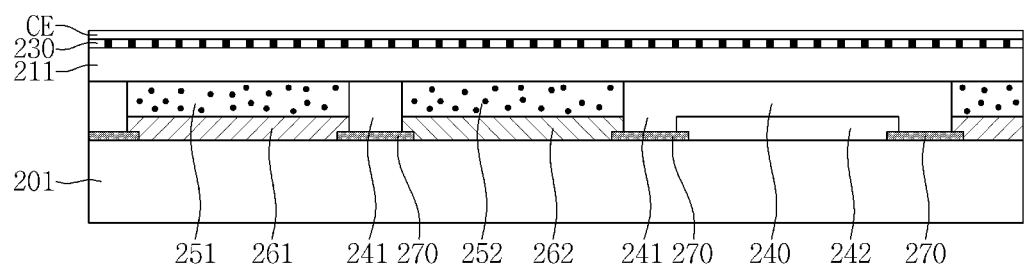

FIG. 10J shows a process of forming the common electrode on the front substrate.

Referring to FIG. 10J, the common electrode CE is disposed on the second polarization plate 230.

The common electrode CE may be a whole plate electrode including a transparent conductor such as indium tin oxide (ITO) or indium zinc oxide (IZO). However, exemplary embodiments are not limited thereto, and the common electrode CE may have a concave-convex shape and/or at least one slit for defining a plurality of domains.

As set forth hereinabove, according to one or more exemplary embodiments, the light conversion portion of the display device is formed through an inkjet process such that the display device may be relatively easily manufactured and high color reproducibility may be achieved.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A photo-luminescent display device comprising:
a backlight portion to output a backlight;
a first substrate and a second substrate facing each other;
a pixel electrode disposed on the first substrate;
a light amount control layer disposed in a space between the first substrate and the second substrate to control transmittance of the backlight;
a first light conversion portion disposed on the second substrate to convert a wavelength of the backlight;
a light diffusion portion disposed adjacent to the first light conversion portion to diffuse the backlight; and
a barrier surrounding the first light conversion portion,
wherein the light diffusion portion and the barrier comprise a unitary structure.

2. The photo-luminescent display device of claim 1, further comprising a second light conversion portion disposed on the second substrate to convert the wavelength of the backlight light.

3. The photo-luminescent display device of claim 2, wherein the first light conversion portion is configured to convert the backlight into a light having a wavelength ranging from about 500 nm to about 565 nm, and the second light conversion portion is configured to convert the backlight into a light having a wavelength ranging from about 620 nm to about 780 nm.

4. The photo-luminescent display device of claim 2, wherein the light amount control layer comprises a liquid crystal layer.

5. The photo-luminescent display device of claim 2, wherein one of the first light conversion portion and the second light conversion portion comprises at least one of a quantum dot and a quantum rod.

6. The photo-luminescent display device of claim 2, further comprising one of a red color filter or a green color filter disposed between the first light conversion portion and the second substrate.

7. The photo-luminescent display device of claim 2, further comprising a yellow filter disposed between the second substrate and at least one of the first light conversion portion and second light conversion portion, and
wherein a transmittance of the yellow filter in a wavelength range from about 450 nm to about 495 nm is less than a transmittance of the yellow filter in a wavelength range of about 500 nm or more.

8. The photo-luminescent display device of claim 1, further comprising a light transmission portion disposed between the light diffusion portion and the second substrate to transmit incident light.

9. The photo-luminescent display device of claim 1, further comprising a blue color filter disposed between the light diffusion portion and the second substrate.

10. The photo-luminescent display device of claim 1, further comprising a black matrix located between the barrier and the second substrate, the barrier comprising a barrier grid defined by barrier walls, the black matrix having a width larger than a width of one of the barrier walls.

11. The photo-luminescent display device of claim 2, further comprising a light transmission portion disposed between the light diffusion portion and the second substrate to transmit incident light,
wherein the first light conversion portion, the second light conversion portion, and a light transmission portion are arranged successively in a row.

12. The photo-luminescent display device of claim 11, further comprising a yellow filter disposed between the first light conversion portion and the second substrate, and between the second light conversion portion and the second substrate,
wherein a transmittance of the yellow filter in a wavelength range from about 450 nm to about 495 nm is less than a transmittance of the yellow filter in a wavelength range of about 500 nm or more.

13. A photo-luminescent display device comprising:
a backlight portion to output a backlight;
a first substrate and a second substrate facing each other, the second substrate including a plurality of first recessed portions;
a pixel electrode disposed on the first substrate;
a light amount control layer disposed in a space between the first substrate and the second substrate to control transmittance of the backlight;
a light diffusion portion located on the second substrate and further comprising a second recessed portion; and
a first light conversion portion and a second light conversion portion disposed in a respective one of the first recessed portions to convert a wavelength of the backlight.

14. The photo-luminescent display device of claim 13, wherein a height of the first light conversion portion in one of the plurality of the first recessed portions and a height of the second light conversion portion in another one of the plurality of the first recessed portions are substantially equal to a height of the light diffusion portion.

15. The photo-luminescent display device of claim 13, further comprising a first color filter and a second color filter, the first color filter being located between the first light conversion portion and the second substrate, and the second color filter being located between the second light conversion portion and the second substrate.

16. The photo-luminescent display device of claim 13, further comprising a light transmission portion disposed in the second recessed portion between the second substrate and the light diffusion portion.

17. The photo-luminescent display device of claim 13, wherein the light amount control layer further comprises a liquid crystal layer.

18. A method of manufacturing a photo-luminescent display device, the method comprising:
forming a light diffusion portion on a substrate;
defining a plurality of first recessed portions by removing a part of the light diffusion portion;
depositing a droplet comprising a phosphor in the plurality of first recessed portions by using an inkjet nozzle located at the plurality of first recessed portions; and
forming a light conversion portion comprising the phosphor by drying the deposited droplet.

19. The method of claim 18, further comprising forming a light transmission portion between the substrate and the light diffusing portion before forming the light diffusion portion on the substrate.

20. The method of claim 19, further comprising forming a color filter between the substrate and the light diffusion portion before forming the light diffusion portion on the substrate.

21. The method of claim 20, wherein the color filter is a yellow filter, and
a transmittance of the yellow filter in a wavelength range from about 450 nm to about 495 nm is less than a transmittance of the yellow filter in a wavelength range of about 500 nm or more.

* * * * *